(12) United States Patent
Bisgrove et al.

(10) Patent No.: US 11,204,063 B2
(45) Date of Patent: Dec. 21, 2021

(54) SLIDING COMPONENT AND METHOD

(71) Applicants: Mahle International GmbH, Stuttgart (DE); Mahle Engine Systems UK Limited, Rugby (GB)

(72) Inventors: William Bisgrove, Abergavenny (GB); Jeff Carter, Moreton Morrell (GB); Ryan Curtis, Rugby (GB)

(73) Assignees: Mahle International GmbH; Mahle Engine Systems UK Limited

( * ) Notice: Subject to any disclaimer, the term of this patent is extended or adjusted under 35 U.S.C. 154(b) by 0 days.

(21) Appl. No.: 16/638,747

(22) PCT Filed: Aug. 7, 2018

(86) PCT No.: PCT/EP2018/071420
§ 371 (c)(1),
(2) Date: Feb. 12, 2020

(87) PCT Pub. No.: WO2019/034484
PCT Pub. Date: Feb. 21, 2019

(65) Prior Publication Data
US 2020/0332832 A1 Oct. 22, 2020

(30) Foreign Application Priority Data
Aug. 15, 2017 (GB) .................................... 1713058

(51) Int. Cl.
*F16C 9/02* (2006.01)
*F16C 17/22* (2006.01)
(Continued)

(52) U.S. Cl.
CPC ................ *F16C 17/24* (2013.01); *F16C 9/02* (2013.01); *F16C 17/022* (2013.01);
(Continued)

(58) Field of Classification Search
CPC .......... F16C 9/02; F16C 17/022; F16C 17/24; F16C 17/243; F16C 17/246; F16C 33/201;
(Continued)

(56) References Cited

U.S. PATENT DOCUMENTS 3,102,759 A * 9/1963 Stewart .................... B61F 15/02
384/276
3,108,264 A * 10/1963 Heinoo .................... G01N 3/56
340/682
(Continued)

FOREIGN PATENT DOCUMENTS

DE 2 115 506 A1 10/1972
GB 2534191 A 7/2016
(Continued)

OTHER PUBLICATIONS

English abstract for JPH06-193629.
(Continued)

*Primary Examiner* — Marcus Charles
(74) *Attorney, Agent, or Firm* — Fishman Stewart PLLC (57) ABSTRACT

The disclosure concerns a sliding component and a method of manufacturing a sliding component. The sliding component includes a substrate and an electrical component. The substrate has a front surface and a rear surface and comprising an electrically-insulating substrate portion extending through a metallic substrate portion, and an electrical connector extending through the electrically-insulating portion between the front surface and the rear surface. The electrical component is arranged at the front surface of the substrate and electrically connected to the electrical connector.

20 Claims, 4 Drawing Sheets

(51) Int. Cl.
  *F16C 17/24* (2006.01)
  *F16C 33/20* (2006.01)
  *F16C 17/02* (2006.01)
  *G01K 13/08* (2006.01)
  *G01K 1/16* (2006.01)
  *G01M 13/04* (2019.01)

(52) U.S. Cl.
  CPC .......... *F16C 33/203* (2013.01); *F16C 33/208* (2013.01); *G01K 1/16* (2013.01); *G01K 13/08* (2013.01); *G01M 13/04* (2013.01); *F16C 2233/00* (2013.01)

(58) Field of Classification Search
  CPC .. F16C 33/203; F16C 33/208; F16C 2233/00; F16C 2240/42; F16C 2240/44; F16C 2208/40; G01K 1/14; G01K 1/16; G01K 13/08; G01M 13/04
  USPC .................................. 384/261, 276, 282, 291
  See application file for complete search history.

(56) References Cited

U.S. PATENT DOCUMENTS

| | | | | |
|---|---|---|---|---|
| 5,701,119 | A * | 12/1997 | Jurras, III | F16C 17/246 340/514 |
| 6,050,727 | A * | 4/2000 | Messmer | F16C 17/03 384/99 |
| 6,206,573 | B1 * | 3/2001 | Miller | F16C 17/246 384/448 |
| 7,270,890 | B2 * | 9/2007 | Sabol | C23C 4/18 428/632 |
| 9,874,494 | B2 * | 1/2018 | Izrailit | F16C 19/522 |
| 2006/0165335 | A1 | 7/2006 | Yoshimura et al. | |
| 2007/0058893 | A1 * | 3/2007 | Patzelt | B41F 33/00 384/448 |
| 2009/0223083 | A1 * | 9/2009 | LeCrone | F16C 17/246 34/524 |
| 2015/0049970 | A1 | 2/2015 | Carnahan et al. | |
| 2016/0208849 | A1 * | 7/2016 | Gorges | F16C 41/002 |
| 2017/0122366 | A1 | 5/2017 | Kuhlmann et al. | |

FOREIGN PATENT DOCUMENTS

| | | |
|---|---|---|
| JP | S54-084153 A | 7/1979 |
| JP | S55-34588 A | 3/1980 |
| JP | S55-34588 U | 3/1980 |
| JP | S55-167104 A | 12/1980 |
| JP | S55-167104 U | 12/1980 |
| JP | S57-52603 A | 3/1982 |
| JP | H06-193629 A | 7/1994 |
| JP | 2008-075625 A | 4/2008 |
| WO | 2011/131826 | 10/2011 |
| WO | 2014/164578 | 10/2014 |

OTHER PUBLICATIONS

English abstract for JP-2008-075625.
English abstract for JP-S-54-084153.
International Preliminary Report on Patentablility and Written Opinion dated Feb. 27, 2020 related to corresponding International Patent Application PCT/EP2018/071420.

* cited by examiner

SLIDING COMPONENT AND METHOD

CROSS-REFERENCE TO RELATED APPLICATIONS

This application claims priority to International Patent Application No. PCT/EP2018/071420 filed on Aug. 7, 2018, and also claims priority to Great Britain Patent Application No. GB 1713058.4 filed Aug. 15, 2017, the contents of each of which is hereby incorporated by reference in their entirety.

TECHNICAL FIELD

The present invention relates to a sliding component and a method for making a sliding component. The sliding component may be a sliding component for an engine, such as a bearing, a bearing shell, a bush, a thrust washer, a journal bearing or the like.

BACKGROUND

In internal combustion engines, the main-bearing assemblies typically each comprise a pair of half bearings retaining a crankshaft that is rotatable about an axis. Each half bearing is a generally semi-cylindrical bearing shell, and typically at least one is a flanged half bearing provided with a semi-annular thrust washer extending outwardly (radially) at each axial end.

Sliding components used in internal combustion engines conventionally have a layered construction, in which a substrate comprising a strong backing material is coated with one or more layers having preferred tribological properties to provide a sliding surface that, in use, faces a cooperating moving part such as a crankshaft journal. In known sliding components such as bearing shells, the substrate comprises a backing (typically of steel, 1-3 mm in thickness) coated with a lining layer (typically of aluminium alloy or bronze, 100-300 µm in thickness), and the substrate is in turn coated with an overlay. The overlay is typically 6 to 25 µm thick and may be formed of a plastic polymer-based composite layer or a metal-alloy layer (e.g. a tin-based alloy overlay).

Polymer-based overlays have become popular in recent years, due to the market penetration of stop/start technology and increasing power output of the engines (higher peak cylinder pressures), and research into sliding components has resulted in a wide range of compositions of polymeric overlay materials. One particularly popular polymer base material is polyamide imide (PAI).

The function of the overlay is to provide a relatively soft, conformable layer that can accommodate any small misalignments between the harder steel crankshaft journal and the bearing shells, and receive and embed dirt particles that may circulate in the oil supply and enter the bearing, so as to prevent damage to or scoring of the journal.

It is generally known that wear of the overlay material can lead to exposure of the lining layer or the substrate to which the overlay material is applied. This can lead to failure of the sliding component due to seizure.

In order to provide a warning prior to failure of a sliding component, it is desirable to be able to monitor the properties of a sliding component without having to manually inspect the sliding component. For example, it may be particularly desirable to be able to monitor the wear on a sliding component without having to manually inspect the sliding component. It is particularly desirable to be able to monitor the properties of a sliding component in real time, for example the wear, temperature, or strain on the component while the engine is running.

The applicant's earlier patent application GB2534191 describes a 'smart' bearing having one or more electronic components formed on the sliding surface of the bearing, which allows certain properties of the bearing to be monitored.

SUMMARY

The invention provides a sliding component, a connector component, and a method of manufacturing a sliding component, as defined in the appended independent claim(s) to which reference should now be made. Preferred or advantageous features of the invention are set out in dependent subclaims.

A first aspect of the present invention may thus provide a sliding component comprising a substrate and an electrical component. The substrate has a front surface and a rear surface and comprises an electrically-insulating substrate portion extending through a metallic substrate portion. An electrical connector extends through the electrically-insulating substrate portion between the front surface and the rear surface. The electrical component is arranged at the front surface of the substrate and is electrically connected to the connector.

The sliding component may be a sliding component for an engine, such as a bearing, a bearing shell, a bush, a thrust washer, a journal bearing or the like. Particularly preferably the sliding component may be suitable for use in engines such as automotive engines, land-based generators, or ship engines.

The sliding component of the present invention may be particularly suitable for use with a polymer overlay, particularly preferably a polyamide-imide (PAI) overlay.

Preferably the substrate is formed from metal, with the exception of the electrically-insulating substrate portion. Particularly preferably the substrate is a hollow cylindrical, or semi-cylindrical substrate, which may be termed a "half-shell".

A particular challenge in the use of electrical components to monitor the properties of sliding components in internal combustion engines is how to provide a connection between the electrical component at the sliding surface and the outside world, for example a processor adapted to receive a signal from the electrical component.

GB2534191 discloses a connection formed from electrical tracking which is tracked from the electrical component across the sliding surface to the edge of the substrate, and around the edge of the substrate to the rear surface of the substrate.

As an alternative, GB2534191 discloses that, for a more lightly loaded bearing shell comprising an oil distribution groove and an oil supply hole, electrical tracking or a pre-formed connector may extend through the oil supply hole to the rear of the substrate.

It would be desirable to provide an improved and more reliable means of electrically connecting electrical components on a sliding surface to further components remote from the sliding component.

The present invention provides an electrical connection from the electrical component through the substrate by providing an electrically-insulating substrate portion in the substrate, through which the connector extends. This arrangement may advantageously provide more reliable connections than the prior art, as the connection may comprise a physical connection passing directly through the substrate from front to rear, rather than electrical tracking along an edge of the substrate. As the connector in the present invention extends through an electrically-insulating substrate portion of the substrate itself, it may advantageously be protected from damage by other moving parts during running. A connection through the electrically-insulating substrate portion may thus be more reliable and less prone to damage than a connection tracked along an exposed edge of the substrate.

The electrically-insulating substrate portion thus performs the roles of locating the connector, protecting it from damage, and electrically insulating it from metallic portions of the substrate itself.

The electrically-insulating substrate portion of the substrate comprises a portion of the substrate in which the entire thickness of the substrate is formed from electrically insulating material. That is, the electrically-insulating substrate portion extends through the metallic substrate portion between the front surface and the rear surface. For example, the electrically-insulating substrate portion may comprise a region that is formed from electrically insulating material instead of metal. The electrically insulating material may, for example, be present in a region from which metal has been removed from the substrate. For example, where a hole has been formed through the metal substrate, the hole may be filled, or sealed, with electrically insulating material to form an electrically-insulating substrate portion of the substrate.

The electrically-insulating substrate portion may preferably comprise a thermosetting polymer, or a resin, that is capable of withstanding the high running temperatures of an internal combustion engine without deforming. Suitable materials for the electrically-insulating substrate portion may include plastic materials such as PBT Polybutylene terephthalate, Polyphthalamide, or Polyamide 66.

Preferably the electrically-insulating substrate portion forms a sealed part of the substrate. That is, preferably there are no gaps or spaces between the electrically-insulating substrate portion and the material forming the remainder of the substrate. Preferably the electrically-insulating substrate portion is configured to prevent oil or other materials from passing through the substrate around or through the electrically-insulating substrate portion. For example, where the electrically-insulating substrate portion is formed by filling a hole in the substrate with electrically insulating material, the electrically insulating material should completely fill, i.e. seal, the hole, so that no hole remains in the finished substrate, or sliding component. The electrically-insulating substrate portion may be formed by filling a hole in the substrate with an electrically-insulating insert configured to completely fill, i.e. seal, the hole. Thus, the electrically-insulating substrate portion may have no effect on the oil pressure in the sliding component when running, compared to a similar metallic substrate without an electrically-insulating substrate portion.

As bearing assemblies used in engines commonly comprise two half bearing shells that are brought together to form a bore for a shaft, one of the two half bearing shells may be subject to a greater load during running than the other. Oil holes are typically provided in the unloaded bearing half shells, for example the upper main bearing supporting a crankshaft. The oil is then supplied from an oil gallery in the engine block through that hole and often a groove. In the crankshaft there is a cross-drilling that connects the main bearing oil supply with the con-rod bearings, so that surplus oil travels from the main to the rod bearings.

Since the oil for the rod bearings is supplied from the journal side (crank pin), there needs to be no hole in the rod bearings.

As discussed above, GB2534191 discloses the possibility of providing an electrical connection through an oil supply hole in a more lightly loaded bearing shell. However, this means of connection would not be possible for a bearing shell that is provided without an oil supply hole.

The present invention thus provides a reliable electrical connection to the electrical component even in sliding components not provided with oil supply holes. The sliding component of the present invention may therefore be particularly suitable for use as the more heavily loaded half of a bearing assembly. The more heavily loaded bearing shell is naturally more vulnerable to wear and damage, so it is highly desirable to monitor characteristics such as wear, temperature and strain on this part of the bearing.

While GB2534191 discloses the possibility that electrical tracking or a pre-formed connector may extend through an oil supply hole, it is clear that the tracking or connector must not block or overly obstruct the oil supply hole. This would prevent oil from passing through the hole, and would therefore prevent the oil supply hole from fulfilling its purpose, causing the bearing to seize.

The sliding component of the present invention may optionally comprise an oil distribution hole, but unlike GB2534191 the electrical connector extends through an electrically-insulating substrate portion of the substrate, and not through the oil distribution hole.

The electrical connector is preferably configured to provide an electrical connection extending from the electrical component through the substrate.

The electrical connector may be an electrically conductive wire, or an electrically conductive pin, which extends through the electrically-insulating substrate portion of the substrate. Preferably the connector may be formed from material that is suitable for connection to, or is matched to, material forming the electrical component. For example, if the component is a thermocouple the material of each pin of the connector may match that of the corresponding thermocouple part. Thus, for a Cu/CuNi thermocouple, one pin may be of Cu and the other of CuNi.

Preferably the electrically-insulating substrate portion is sealed around the connector.

The connector may be configured to protrude from, or extend out of, the front and or rear surfaces of the electrically-insulating substrate portion, to facilitate the formation of an electrical connection between the connector and the electrical component. However, it is preferred that the connector is flush with, or level with, the adjacent surface(s) of the electrically insulating substrate portion so that a printed circuit may be printed onto the connector with a minimal 'step', or change in level, in the print.

The substrate may comprise one or more connectors arranged to extend through the electrically-insulating substrate portion.

Preferably the sliding component comprises two connectors, configured to act as positive and negative connections, or positive and negative terminals of an electrical circuit.

The front surface of the substrate is preferably coated with one or more electrically insulating layers formed of electrically insulating material. Preferably the one or more electrically insulating layers may comprise a polymer overlay material. Particularly preferably the one or more electrically insulating layers may comprise polyamide imide (PAI). Preferably the whole front surface of the substrate is coated with electrically insulating polymer overlay material.

The overlay-coated front surface of the substrate forms a sliding surface which is configured to face and slide against a cooperating moving part, in use. The sliding surface of the sliding component is thus the exposed surface of the uppermost layer of overlay, which is configured to slide against a cooperating surface.

The electrical component must be electrically insulated from the metallic portion of the substrate to prevent a short circuit. The electrical component may be electrically insulated from the substrate by an electrically insulating layer of overlay material formed between the substrate and the electrical component, or the electrical component may be coated in an electrically insulating material.

The electrical component is arranged at the front surface of the substrate, so that in use the electrical component is positioned between the substrate and the interface between the sliding component and the cooperating moving part. The electrical component may be formed on the sliding surface, that is on the top of the uppermost layer of overlay, or it may be embedded within overlay material below the sliding surface. Preferably the electrical component may be positioned on a first layer of overlay which insulates the electrical component from the substrate, and beneath a second layer of overlay, so that the electrical component is at least initially protected from damage by moving parts at the sliding surface.

The electrical component may comprise a resistor, or a capacitor, or a pressure sensor, or a strain sensor, or a transistor. The electrical component may be a resistance temperature detector, which may comprise an electrical element of platinum, nickel or copper. The electrical component may comprise a thermocouple, or a continuity monitoring element. The electrical component may comprise a dielectric material, or a semiconductor material.

An adhesion promoter may be provided between the electrical component and an electrically insulating layer.

The sliding component may comprise a plurality of electrical components. The plurality of electrical components may be identical, or may be of more than one type. The plurality of electrical components may be electrically connected together in an electrical circuit.

The electrical component may be formed or deposited by printing. Alternatively, the electrical component may be formed or deposited by adhering a flexible electronic insert onto an electrically insulating layer.

The electrical component is preferably connected to the connector using electrically conductive adhesive. Typical conductive adhesives may consist of a conductive material such as copper, silver or graphite in a resin (for example a one or two component resin, such as an epoxy resin). The adhesive may typically contain about 80% of the conductive material, by weight.

Alternatively the electrical component may be connected directly to the connector, for example by printing the electrical component onto the connector itself.

In use, the electrical component preferably provides an output signal, through the connector, to a second electrical component remote from the sliding surface. The electrical component is preferably configured so that a property of the output signal changes according to the conditions at the sliding surface. For example, where the electrical component is a thermocouple the output signal may vary according to the temperature at the sliding surface. The electrical component may be configured so that the output signal varies according to wear experienced at the sliding surface. For example, where the electrical component is a resistor embedded in polymer overlay, wearing away of the polymer overlay will cause the resistor to be exposed and in turn worn away during running of the engine. The resistance of the resistor may advantageously change as the wear of the overlay and then the resistor itself advances, so monitoring the resistance of the resistor may give a measure of wear at the sliding surface without having to visually inspect the bearing.

According to a preferred embodiment, the substrate comprises a groove which extends over a portion of the front surface and coincides with the electrically-insulating substrate portion, such that the electrically-insulating substrate portion extends through the substrate between the groove and the rear surface of the substrate. The groove comprises a portion of the substrate that is thinner than the remainder of the substrate, and is preferably a straight, or linear, groove. The groove is formed in the front surface of the substrate, such that a region within the groove is recessed from the front surface. Preferably the electrically-insulating substrate portion is positioned within the groove.

The groove may be formed in the backing layer of the substrate, or the lining layer if present, or both.

Where the substrate comprises a groove, preferably the connector extends between the groove (for example the bottom or base of the groove) and the rear surface of the substrate. The groove may advantageously allow the electrical component to be positioned, or the electrical connection to the connector to be made, in the recessed region within the groove such that it is below the sliding surface and protected from the moving parts at the sliding surface.

The groove may be provided anywhere on the front surface of the substrate, allowing the connector and the electrically-insulating substrate portion to be positioned at a desired location, for example away from a heavily loaded region or the joint face region of the sliding component. The existence of a groove may also advantageously allow the electrical component to be positioned either partially or entirely within the groove. Positioning the electrical component within the groove may advantageously protect it against potential damage from the moving parts at the sliding surface. Alternatively, the electrical component may be positioned outside the groove, but the electrical connection to the connector may be made, for example with conductive adhesive, at a protected position inside the groove.

In a particularly preferred embodiment the groove comprises first and second ramped end sections arranged at either end of a central section of uniform depth. Providing ramped end sections may advantageously allow electrical components formed outside the groove to be connected to the connector within the groove, without the need for any sharply angled connections that may be prone to breakage.

Preferably the connector extends between the rear surface of the substrate and the central section of the groove. Preferably the electrically-insulating substrate portion extends between the rear surface of the substrate and the central section of the groove. The electrically-insulating substrate portion and/or the connector may extend or protrude into the region within the groove. That is, the electrically-insulating substrate portion may have a thickness that is equal to or less than the thickness of the substrate outside the groove, and/or a thickness that is equal to or greater than the thickness of the substrate at the central section of the groove. By controlling the thickness of the electrically-insulating substrate portion the position of the connector relative to the sliding surface may be controlled.

Preferably the electrical component is at least partially arranged on one of the first or second ramped end portions of the groove. By positioning electrical components on the ramped end portions, the distance between the electrical component and the sliding interface may be controlled. This may advantageously allow the sensitivity of the electrical components to be controlled, as their sensitivity increases the closer they are to the sliding surface, but the risk of damage to the component also increases nearer the sliding surface.

Preferably the first and second ramped end sections each comprise at least 20%, or at least 30%, or at least 40%, of the total length of the groove. By varying the lengths of the ramped end sections, the gradient of the ramped end sections may be controlled and thereby the range of positions, or depths, at which an electrical component may be formed can be controlled.

Preferably the substrate is cylindrical or semi-cylindrical, and the groove is arranged to extend circumferentially around the substrate. Arranging the groove circumferentially may advantageously reduce axial leakage of oil compared to an axially-disposed groove.

In a preferred embodiment the groove extends circumferentially over an angular distance of 65 degrees or less, or 55 degrees or less or 45 degrees or less, or 30 degrees or less, or 20 degrees or less. Thus, unlike known oil distribution grooves, which are provided circumferentially around the entire surface (through 180 degrees) of a half-shell bearing, it is preferred that the grooves of the present invention extend over only a portion of the sliding component.

Particularly preferably, where the sliding component is a semi-cylindrical half-shell bearing the groove is arranged so that a first end of the groove does not extend into the joint face relief area of the bearing. This may advantageously avoid or reduce the flow of oil from the groove into the joint face relief area, in order to suppress excessive flow out of the bearing.

In order to reduce oil flow from the groove into the joint face relief area, the angular position of the groove on the substrate may be such that the first end of the groove is at least 8 degrees, or at least 10 degrees, or at least 15 degrees away from a first joint face of the sliding component.

Preferably the groove is arranged so that the groove does not extend over the most heavily loaded region of the sliding component, which typically occurs at the crown (90 degrees from the joint face) of a half-shell bearing. As the substrate naturally has a reduced thickness at the groove, positioning the groove so that it does not extend over the loaded region may advantageously preserve the strength of the substrate in the loaded region.

Preferably a second end of the groove is less than 80 degrees, or less than 70 degrees, or less than 60 degrees away from the first joint face of the sliding component, so that the groove does not extend over the most heavily loaded portion of the substrate.

In a particularly preferred embodiment, the first end of the groove is positioned approximately 8 degrees from the first joint face, and the second end of the groove is positioned approximately 69 degrees from the same joint face. The inventors have found that a groove extending circumferentially over this angular distance provides advantageous strength and oil leakage behaviour.

In a preferred embodiment, the greatest depth of the groove comprises between 25% and 75%, or between 45% and 60%, of the thickness of the substrate. Particularly preferably the depth of the groove may be between 0.5 mm and 1.5 mm Therefore, in a typical substrate comprising a lining layer of thickness 100-300 µm over a steel backing layer of 1-3 mm thickness, the groove may extend into the steel backing.

Preferably the width of the groove comprises between 5% and 30%, or between 10% and 20%, of the width of the substrate. Particularly preferably the width of the groove may be between 1 mm and 5 mm, or between 2 mm and 4 mm.

At the rear surface of the substrate, the connector may be electrically connected to a second electrical component that is configured to receive a signal from the electrical component on the front surface. The second electrical component may be, for example, a processor, or a wireless transmitter.

In a preferred embodiment, the electrically-insulating substrate portion of the substrate may comprise a connector component, as described below.

According to a second aspect of the present invention, there is provided a connector component for use in the sliding component of the first aspect.

The connector component may comprise an electrically-insulating insert having a first surface and a second surface, and a connector configured to extend through the electrically-insulating insert to provide an electrical connection from the first surface to the second surface. The electrically-insulating insert is configured to engage with and seal a hole through a substrate.

The electrically-insulating insert may preferably comprise a thermosetting polymer, or a resin, that is capable of withstanding the high running temperatures of an internal combustion engine without deforming.

The electrically-insulating insert may be provided in a variety of shapes and sizes, depending on the substrate with which the connector component is to be used. The shape and size of the insert may vary, as long as it is configured to engage with and seal a corresponding hole in a substrate. Preferably the insert has a thickness corresponding to the thickness of the substrate which the insert is configured to engage. Preferably the insert has a cross-section corresponding to the shape and size of the substrate which the insert is configured to engage with and seal.

In a preferred embodiment, the connector component is configured to engage with and seal a round hole in the substrate. The electrically-insulating insert is therefore provided as a cylindrical insert with a circular cross-section, the radius of which is approximately equal to the radius of the hole in the substrate. The insert may thus be a tight fit when inserted into the hole, so that the hole is sealed, and the insert is held in the hole by an interference fit. In addition, the material of the polymer insert (in particular its thermal expansion coefficient) is advantageously matched to the material of the substrate to maintain the interference fit throughout the heat cycles experienced during manufacture and operation of the bearing.

The connector component may be sealable within a hole through a substrate using adhesive or sealant, or the connector component may be held in place by interference fit.

The connector may be an electrical wire or pin extending axially through the electrically insulating insert. Preferably the connector component comprises a plurality of connectors extending through the electrically-insulating insert. Particularly preferably two connectors extend through the electrically-insulating insert, for providing positive and negative connections to an electrical component.

According to a third aspect of the present invention, there is provided a method of manufacturing a sliding component of the first aspect of the invention, comprising the steps of:
a) providing a connector component according to the second aspect of the invention; b) inserting the connector component into a hole in a substrate so that the connector component extends through and seals the hole; and c) forming an electrical connection between an electrical component and the connector component.

The method may comprise the additional steps, between steps a) and b), of: d) applying a first layer of electrically insulating material to a front surface of the substrate; and e) forming an electrical component on the first layer of electrically insulating material.

Following step c), the method may comprise a further step f) applying a second layer of electrically insulating material on top of the electrical component and the first layer of electrically insulating material. Step f) thus has the effect of embedding the electrical component in electrically insulating material. By controlling the thickness of the second layer of electrically insulating material it is possible to control the distance between the electrical component and the sliding surface.

The first and second layers of electrically insulating material, if added, may be polymer overlay material, preferably polyamide-imide (PAI) overlay material.

Preferably the electrical component is formed by printing. For example, the electrical component may be formed by printing using electrically conductive ink and/or electrically resistive ink. The ink may be a dispersion of metallic particles (e.g. gold, silver or copper) for a conductive layer (e.g. electrical tracking), carbon particles for a resistive layer, or semiconducting particles for a semiconducting layer. Alternative particulate dispersions may comprise metal oxides, or silver based compounds, including silver neodecanoate. Chloride inks may also be used. Further, the electrical component may comprise a patterned layer of dielectric ink for a dielectric layer. The electrical component may comprise a layer with conductive ceramic particulate material, e.g. conductive metal oxide (e.g. ZnO, InO, ITO, {indium tin oxide}), or graphene oxide. Alternatively, the electrical component may comprise an organic semiconductor material.

Preferably the method comprises the additional first step of providing a substrate comprising a groove which extends circumferentially around a portion of the substrate, and coincides with the hole, such that the hole extends between the groove and the rear surface of the substrate.

According to a fourth aspect of the present invention, there is provided a method of manufacturing a sliding component of the first aspect of the invention, comprising the steps of: a) positioning an electrically conductive connector to extend through a thickness of a substrate; b) inserting electrically insulating material to form an electrically-insulating substrate portion extending between a front surface and a rear surface of the substrate, so that the connector extends through the electrically-insulating substrate portion; and c) forming an electrical connection between an electrical component and the connector.

The method may comprise the features and additional steps discussed in relation to the third aspect of the invention, above.

According to a fifth aspect of the present invention, there is provided a substrate for a sliding component, the substrate having a front surface and a rear surface and comprising: an electrically-insulating substrate portion extending between the front surface and the rear surface; and a connector for providing an electrical connection through the substrate; wherein the connector is configured to extend through the electrically-insulating substrate portion of the substrate.

The substrate may comprise an electrical component positioned at the front surface of the substrate, and electrically insulated from the substrate.

In a preferred embodiment, the electrically-insulating substrate portion of the substrate may comprise a connector component as described above in relation to the second aspect of the invention.

Features described above in relation to one aspect of the invention may preferably be applied to any other aspect of the invention. In particular, features described in relation to the first aspect of the invention may be applicable to the second and fifth aspects of the invention.

BRIEF DESCRIPTION OF THE DRAWINGS

Some example or preferred embodiments of the present invention will now be described in detail, by way of example only, with reference to the accompanying drawings, in which.

DETAILED DESCRIPTION

Figure 1:
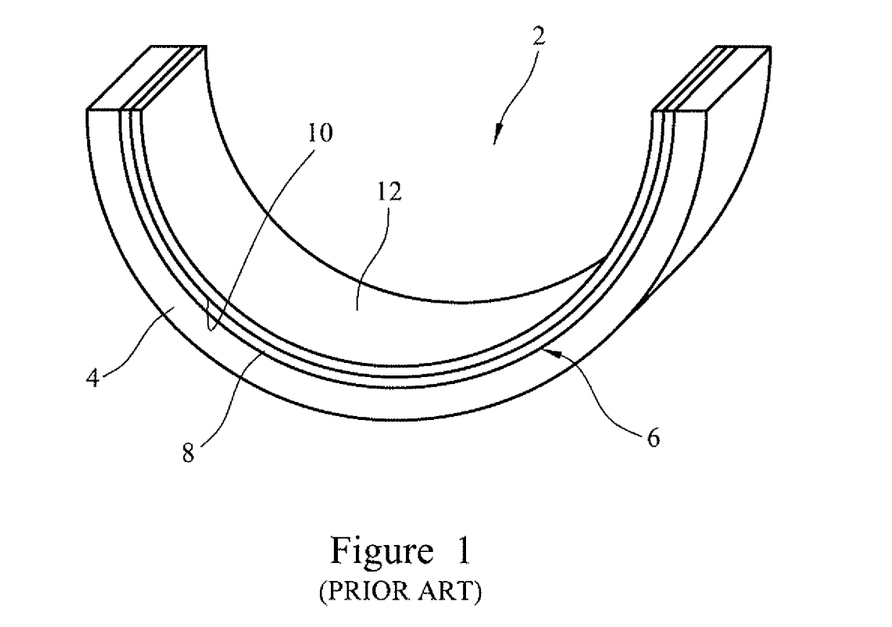
FIG. 1 is a schematic diagram of a half-shell of a conventional prior art plain bearing.

FIG. 1 shows a conventional prior art half shell 2 of a sliding bearing comprising a strong backing 4 of steel, a bearing lining layer 6, comprising a layer 8 of a copper-based alloy or an aluminium-based alloy bonded to the backing and a nickel diffusion barrier, or interlayer, 10, and a plastics, polymer-based overlay layer 12 bonded to the lining layer. In other prior art bearing shells the overlay may be bonded directly to the backing, and the lining layer omitted, depending on the compatibility of the materials used and the intended use of the bearing.

Figure 2:
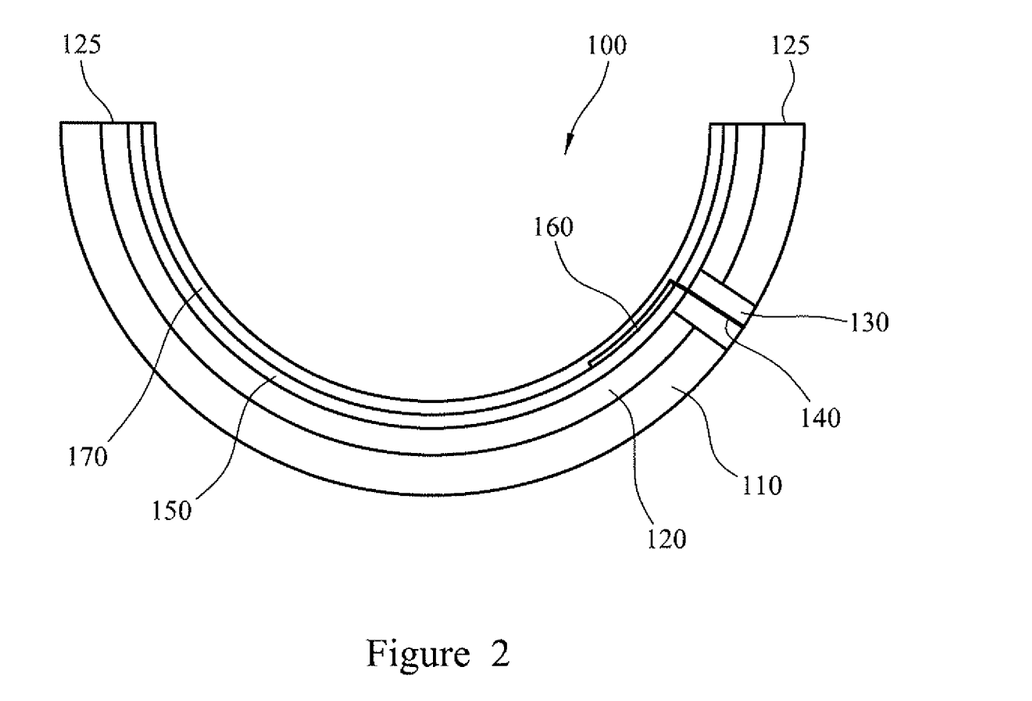
FIG. 2 is a cross-sectional view through a bearing shell according to a first embodiment of the present invention.

FIG. 2 shows a semi-cylindrical half shell 100 of a sliding bearing according to a first embodiment of the present invention. The bearing shell 100 has a substrate comprising a strong backing 110 of steel and a bearing lining layer 120 which forms the front surface of the substrate. Circumferentially opposing edges of the bearing shell 100 form joint faces 125, which are configured to connect to the joint faces of a second corresponding half shell in order to form a cylindrical bearing shell.

A region of the substrate is formed from electrically insulating material which forms an electrically-insulating substrate portion 130 extending between the front surface and the rear surface of the substrate. The electrically-insulating substrate portion 130 extends through the entire thickness of the substrate, including the backing 110 and lining layer 120.

Two metal pin connectors 140 (only one of which is shown in FIG. 2) are arranged to extend through the electrically-insulating substrate portion 130, so that a front end of each pin 140 protrudes from the front surface of the electrically-insulating substrate portion 130, and a rear end of each pin 140 is exposed on the rear surface of the electrically-insulating substrate portion 130. The metal pin connectors 140 are insulated from the steel backing and the lining layer by the electrically insulating material of the electrically-insulating substrate portion 130.

A first layer of polymer overlay 150, formed from polyamide-imide (PAI) polymer, is arranged to cover the front surface of the lining layer 120 and the electrically-insulating substrate portion 130.

An electrical resistor 160 is positioned on the first layer of polymer overlay 150, such that the resistor is electrically insulated from the substrate by the first layer of polymer overlay. The resistor 160 is formed from a strip of electrically resistive material arranged on the first polymer overlay layer 150 so that a first end of the resistor is positioned above a first of the two metal pin connectors 140, and a second end of the resistor is positioned above a second of the two metal pin connectors 140.

The first and second ends of the resistor 160 are electrically connected to the first and second metal pin connectors 140, respectively, through the first polymer overlay layer, so that the metal pin connectors 140 each provide an electrical connection from the resistor, through the substrate, to the rear ends of the connectors 140. The rear ends of the pin connectors 140 are further connectable to another electrical component (not shown) configured to receive a signal from the resistor 160. Thus, the connectors 140 may be used as positive and negative terminal connections to the resistor 160 on the front surface of the bearing shell 100.

A second layer of polymer overlay 170, also formed from PAI, is formed over the resistor 160 and the first layer of polymer overlay 150, so that the resistor is effectively embedded in the polymer overlay.

The uppermost surface of the second layer of polymer overlay 170 provides a running surface (i.e. a sliding surface) of the bearing shell 100. In use, within an assembled bearing, the second layer of polymer overlay 170 faces a rotating bearing journal with which the bearing shell 100 mutually cooperates, with an intervening film of lubrication oil.

In the embodiment shown in FIG. 2, the resistor 160 and the electrically-insulating substrate portion 130 are formed in a position that is circumferentially removed from and/or between the joint faces 125 and the crown (mid-way between the joint faces) of the half shell. Commonly in crankshaft bearing assemblies, the bearing shells are orientated for the highest load (arising during the firing of the corresponding piston) to occur at the crown of the bearing shell. Positioning the resistor out of the region of highest load may advantageously extend the lifetime of the resistor.

The rear end of the connectors 140 may be electrically connected to a monitoring module (not shown) comprising a processor. In use, the monitoring module measures the resistance of the resistor 160. Once the uppermost second layer of polymer overlay 170 has been worn away, the resistor 160 will commence being worn away, during further use. From the measured electrical resistance of the resistor 160, the monitoring module may determine whether a part of resistor 160 has been completely worn away, breaking the continuity of the electrical circuit. Advantageously, the monitoring module may operate an alarm and/or deactivate the operation of the engine, if it detects that the second layer of polymer overlay 170 has become worn through. Further, if the resistor 160 is formed from a thick layer of electrically resistive material, the electrical resistance of the resistor will change as it becomes worn. Advantageously, monitoring the electrical resistance of the resistor 160 enables the level of wear of the overlay 170, 150 to be determined with greater sensitivity, enabling different levels of alarm to be provided by the monitoring module (e.g. yellow and red warning alarms) corresponding to different levels of wear of the overlay.

Although FIG. 2 illustrates a resistor 160 as an exemplary electrical component, alternative or additional electrical components may be provided. Thus, in alternative embodiments of the invention the resistor 160 shown in FIG. 2 may alternatively be a different type of electrical component. For example, the resistor may instead be a resistance temperature detector element (e.g. comprising a strip of platinum, nickel or copper) having an electrical resistance that varies according to its temperature. In this case, by measuring the resistance of the electrical component (and potentially with reference to a previously measured calibration resistance), the monitoring module may determine the temperature of the bearing shell 100. Advantageously, the monitoring module may operate an alarm and/or deactivate the operation of the engine, if the bearing shell should become overheated. In another preferred embodiment, the bearing shell is provided with a strip of highly conductive electrically tracking (e.g. a strip patterned from a metal coating), for detecting a break in electrical continuity caused by wear. In a further alternative, the bearing shell may be provided with a thermocouple (e.g. bimetallic element) for sensing the temperature of the bearing. In a yet further alternative, the electrical component may function as a strain sensor (strain gauge).

Figure 3:
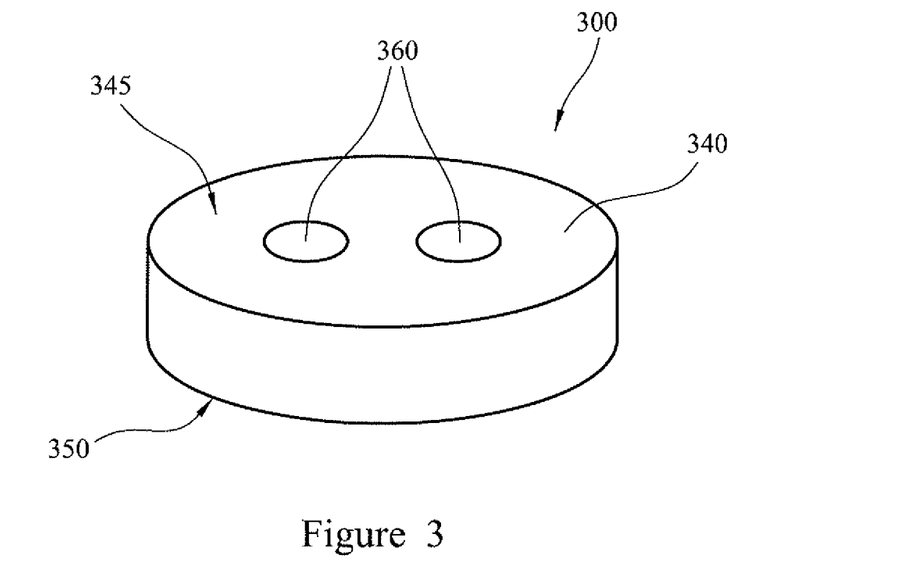
FIG. 3 is a perspective view of a connector component according to a second embodiment of the present invention.

FIG. 3 shows a connector component 300 according to a preferred embodiment of the present invention. The connector component 300 comprises an insert 340 of electrically insulating thermosetting polymer, which is cylindrical in shape between a first end surface 345 and a second end surface 350.

The electrically insulating insert is formed from a thermosetting polymer that is capable of withstanding the high running temperatures of an internal combustion engine without deforming.

A pair of metal pin connectors 360 extend parallel to one another through the electrically insulating insert from the first surface to the second surface, such that a first end of each connector 360 is exposed at the first surface 345 of the insert, and a second end of each connector is exposed at the second surface 350 of the insert. The pair of connectors 360 are separated and electrically insulated from one another by the electrically insulating material forming the insert 340.

The connector component 300 is configured to engage with and seal a hole in a bearing substrate, in order to provide an electrical connection between a first surface and a second surface of the substrate. Once the connector component 300 is engaged with and sealed into a substrate, it forms an electrically-insulating substrate portion of the substrate, which extends through an entire thickness of the substrate.

The connector component 300 may be formed by 3D printing. This process may advantageously enable the fabrication of the electrically-insulating component incorporating the connector. For example the connector may be in the form of a pin or pins, around which the electrically-insulating material is 3D printed. Alternatively, the connector component may be formed by moulding or other suitable process.

Figure 4:
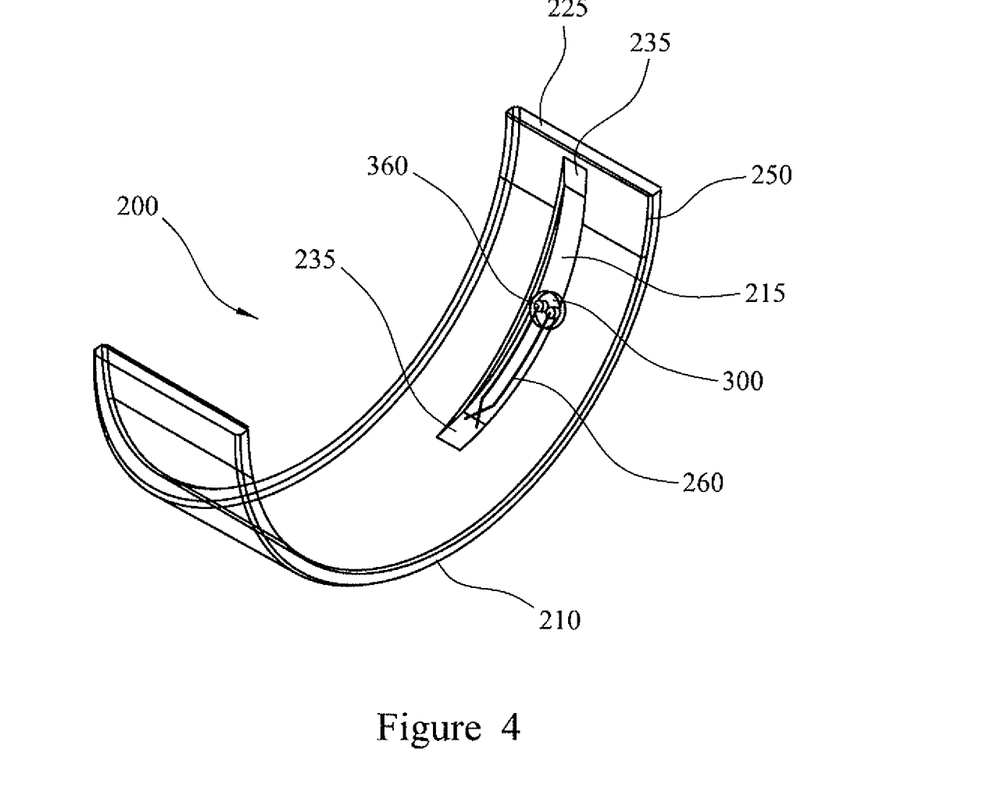
FIG. 4 is a perspective view of a bearing shell according to the second embodiment of the present invention, with features represented transparently for illustrative purposes only.

FIG. 4 shows a perspective view of a bearing shell 200 according to a second embodiment of the present invention, incorporating the connector component 300 of FIG. 3.

The substrate of the bearing shell 200 comprises a steel backing layer 210 in which is formed a groove 215. The bearing shell 200 does not comprise a lining layer.

The groove 215 runs circumferentially around the substrate over an angular distance of approximately 60 degrees, or one third of the bearing shell, and is positioned so that a first end of the groove is positioned approximately 5 degrees from a first joint face 225, and a second end of the groove is positioned approximately 70 degrees from the same joint face. The width of the groove 215 is equal to approximately 20% of the width of the substrate, while the depth of the groove is equal to approximately 50% of the thickness of the substrate.

The groove 215 has a tapered cross section, across its width, and comprises first and second ramped end sections 235 arranged at either end of a central section of uniform depth.

A connector component 300, as described in relation to FIG. 3 above, is positioned in the central portion of the groove 215 so as to form an electrically-insulating substrate portion of the substrate. The connector component is embedded, or pressed into, the substrate backing 210 such that it extends through and seals a hole formed in the steel substrate backing 210, and is held in place by an interference fit. The thickness of the connector component is equal to the thickness of the substrate at the central section of the groove 215, so the first and second surfaces of the connector component 300 are flush with the central section of the groove and the rear surface of the substrate, respectively.

A layer of electrically insulating PAI overlay 250 covers the entire front surface of the substrate, including the groove 215.

A Cu/CuNi thermocouple 260 is embedded within the layer of PAI overlay 250, so that the conductors of the thermocouple are positioned within, and extend longitudinally along, the groove 215. An end of each thermocouple conductor is electrically connected to a metal pin connector 360 of the connector component 300.

As shown in FIG. 4, the groove 215 extends over an angular distance of approximately 55 degrees, and is positioned between the joint face 225 and the crown of the bearing shell 200. Positioning the groove 215 away from the crown of the bearing shell may advantageously ensure that the thinner region of the steel backing 210, which occurs at the groove 215, does not extend over the most heavily-loaded region of the bearing shell. Positioning the groove slightly away from the joint face 225 may further prevent or reduce oil from flowing from the groove into the joint face region and out of the bearing.

Figure 7:
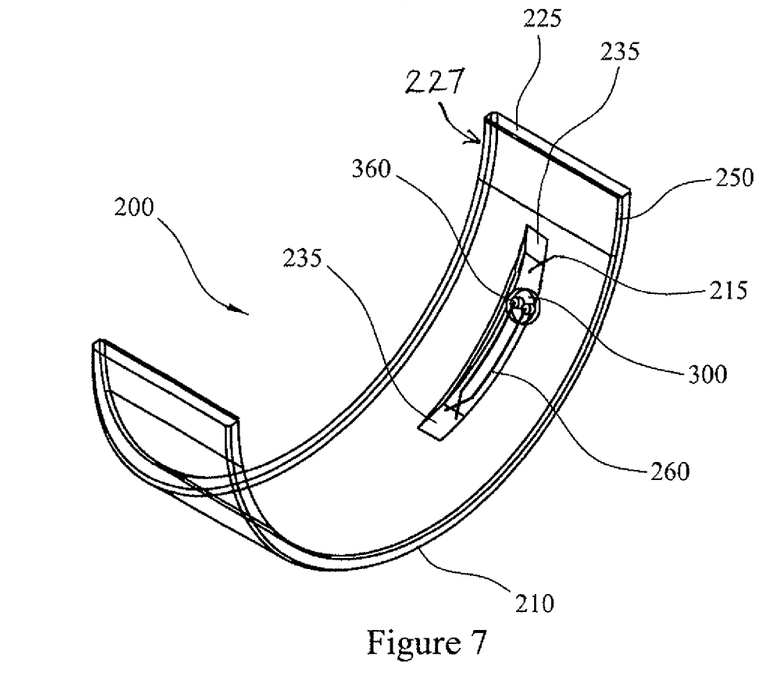
FIG. 7 is a perspective view of a bearing shell according to a third embodiment of the present invention, with features represented transparently for illustrative purposes only.

A preferred embodiment is illustrated in FIG. 7, in which the same reference numerals are used as in FIG. 4. In the embodiment of FIG. 7, the groove 215 is spaced from the joint face relief region 227 at the end of the bearing shell near the joint face 225. The thinner region of the backing at the base of the groove is thus advantageously spaced from the heavily loaded joint face relief region.

As described above in relation to FIG. 2, the embodiment of FIG. 4 may be provided with one or more alternative types of electrical component.

Figure 5:
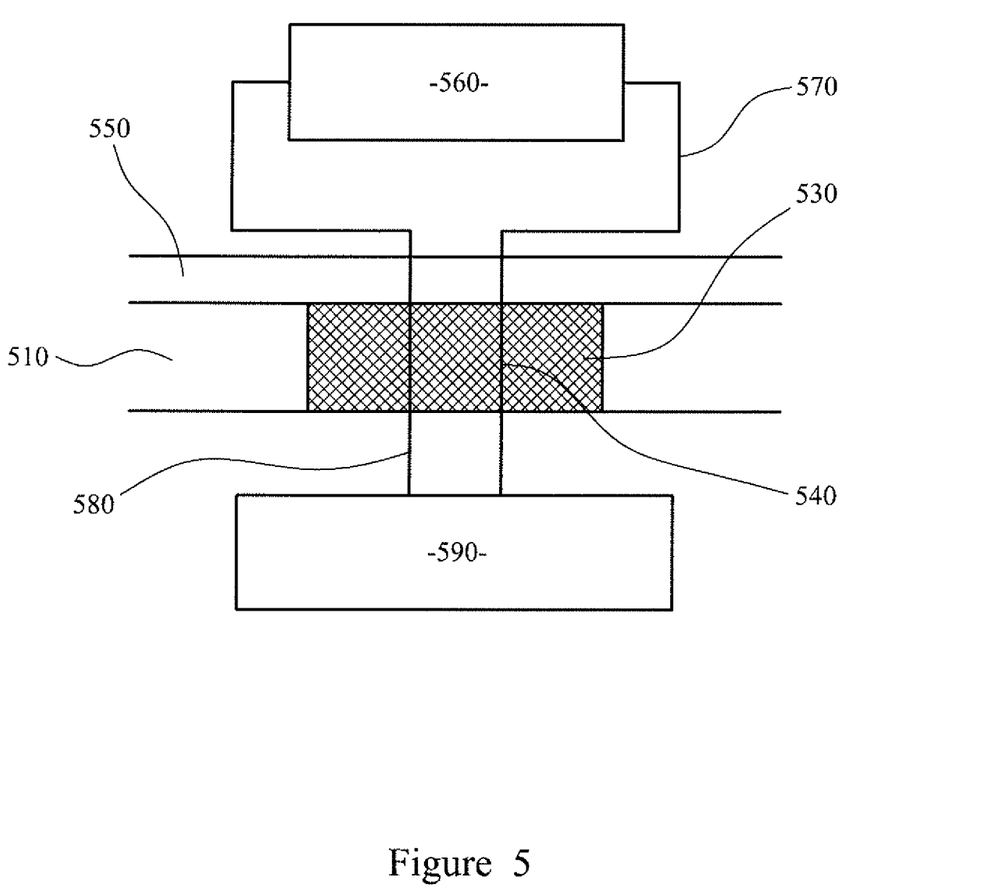
FIG. 5 is a schematic bearing cross-section, showing the connection between the electrical component at the front surface of a sliding component and a processor.

FIG. 5 shows a schematic connection between an electrical component 560 which is arranged on the front surface of a substrate 510, and insulated from the substrate by a first layer of polymer overlay 550. Electrical tracking 570 formed on the front surface of the polymer overlay 550 is electrically connected to the front ends of a pair of electrically conductive connector pins 540 by electrically conductive adhesive (not shown). The connector pins 540 are configured to extend in parallel through an electrically-insulating substrate portion 530 of the substrate. At the rear surface of the substrate 510, the rear ends of the connector pins 540 are electrically connected to a processor 590 by electrical wiring 580.

Although the connection between the rear ends of the connector pins 540 and the processor 590 are illustrated with electrical wiring 580, the connector pins may instead be connected to a wireless transmitter configured to transmit a signal to a processor remote from the sliding component.

Although preferred embodiments of the invention have been illustrated with bearing half-shells, the invention may be provided as an alternative type of sliding component, for example as a bush, a thrust washer, a journal bearing or the like.

Figure 6:
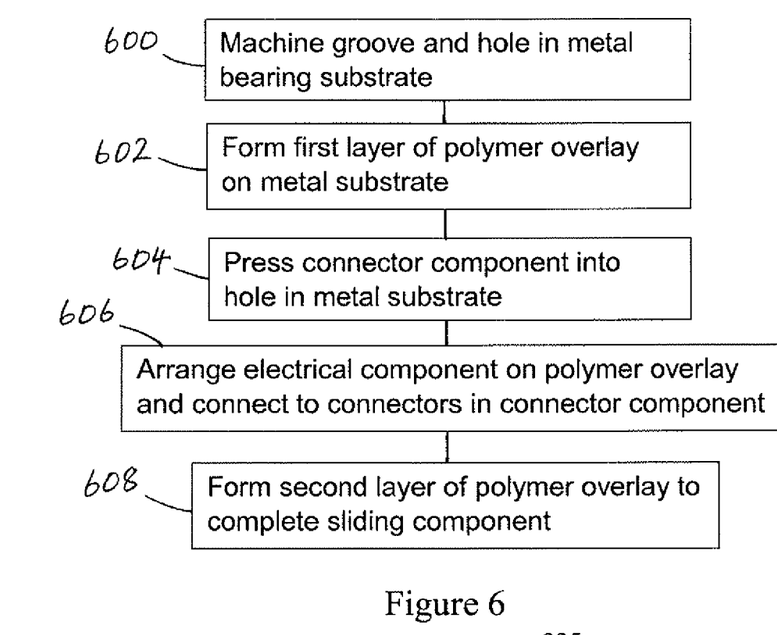
FIG. 6 is a block diagram schematically illustrating a method of manufacturing the bearing shell of FIG. 4 or 7.

FIG. 6 illustrates a preferred method of manufacturing a bearing shell embodying the present invention, such as the bearing shell shown in FIG. 4.

The bearing shell 200 of FIG. 4 may be manufactured using the connector component 300 of FIG. 3, and a steel substrate 210 which comprises a groove 215 and a hole extending through the substrate.

After machining 600 the groove and the hole in the steel substrate 210, a first layer of polymer overlay 250 is applied 602 to the front surface of the steel substrate 210. The polymer overlay may be applied using any known technique. Once applied, the polymer overlay 250 covers the front surface of the substrate 210, including the groove 215.

The connector component 300 is then inserted, or pressed, 604 into the hole through the substrate 210, such that the connector component extends through the hole and is held in place by an interference fit. The connector component 300 is configured to fill the hole, and to be a tight fit, so that inserting the insert 340 into the hole completely seals the hole. Once the insert 340 is engaged with the hole, its front and rear surfaces are level with the front and rear surfaces of the substrate 210 (i.e. the front surface at the base of the groove).

The thermocouple 260 is then formed 606 on the polymer overlay and on the surface of the connector component 300 by printing with electrically conductive ink.

The electrical component may be formed by printing a patterned layer of ink. The ink may comprise a dispersion of metallic particles (e.g. gold, silver or copper) for a conductive layer (e.g. electrical tracking), carbon particles for a resistive layer, or semiconducting particles for a semiconducting layer. Alternative particulate dispersions may comprise metal oxides, or silver based compounds, including silver neodecanoate. Chloride inks may also be used. Further, the electrical component may comprise a patterned layer of dielectric ink for a dielectric layer. The electrical component may comprise a layer with conductive ceramic particulate material, e.g. conductive metal oxide (e.g. ZnO, InO, ITO, {indium tin oxide}), or graphene oxide. Alternatively, the electrical component may comprise an organic semiconductor material.

The patterned layer or layers of the electrical component may be patterned by a photolithographic process. The patterned layer may have a thickness of about 10 nm or more (where thickness refers to the direction perpendicular to the sliding surface of the bearing).

Alternatively to patterning a deposited layer, the electrical component may be deposited by printing, or by the adhesion of an electrical component formed on a tape substrate, or another pre-printed electrical insert. The electrical component may be deposited onto a curved surface, e.g. the electrically insulating first overlay layer of a curved bearing shell. For example, the pre-printed electrical insert may be a flexible substrate having a surface coated with adhesive, which may be applied to the substrate as an adhesive tape. Alternatively, the electrical component may be printed or otherwise formed on a flat blank substrate, before it is curved to shape.

In the embodiment, as the thermocouple 260 is formed on the first layer of overlay material 250 and the surface of the connector component 300, the ends of each thermocouple conductor are electrically connected to a respective metal pin connector 360 by printing the thermocouple directly onto the exposed ends of the connector pins. In alternative embodiments, if required, an electrical component formed or attached to the bearing substrate may be electrically connected to the connector pin or pins using an electrically conductive adhesive.

A further, second, layer of polymer overlay 250 may then be applied 608 to cover the thermocouple. This has the effect of embedding the electrical component in electrically insulating material. By controlling the thickness of the second layer of electrically insulating material it is possible to control the distance between the electrical component and the sliding surface, and therefore to control the sensitivity of the electrical component.

The rear ends of the connector pins 360 may be electrically connected to a second electrical component (not shown) arranged at the rear surface of the substrate 210, or remote from the bearing shell 200. The connector pins 360 may be connected to the second electrical component by printed electrical tracking or wiring, or any other suitable connection means.

The method may comprise the initial step of forming a connector component 300, for example by 3D printing an electrically insulating insert 340 through which extend two electrically conductive connector pins 360.

The method of manufacturing may comprise the first step of forming a hole through the substrate 210, for example by machining or drilling a hole through a blank substrate. The method of manufacturing may comprise the further optional step of providing, for example by machining the steel backing layer, a groove in the substrate 210.

The second overlay layer 170 of the first embodiment and the second overlay layer 270 of the second and third embodiments are commonly deposited as a layer of polymer suspended in a solvent, and the solvent is removed during a thermal curing stage. The electrical component may be deposited as an insert in which electrical tracking is provided on an electrical substrate that is soluble in the polymer solvent, and the electrical substrate may dissolve into the material of the overlay layer, before the overlay is cured.

The invention claimed is:

1. A sliding component, comprising:
   a substrate and an electrical component;
   the substrate having a front surface and a rear surface and comprising an electrically-insulating substrate portion extending through a metallic substrate portion, and an electrical connector extending through the electrically-insulating portion between the front surface and the rear surface; and
   wherein the electrical component is arranged at the front surface of the substrate and electrically connected to the electrical connector.

2. A sliding component according to claim 1, wherein the substrate includes a groove structured and arranged to extend over a portion of the front surface and coincide with the electrically-insulating substrate portion, such that the electrically-insulating substrate portion extends between the groove and the rear surface of the substrate.

3. A sliding component according to claim 2, wherein the groove includes a first ramped end section and a second ramped end section arranged at either end of a central section of uniform depth.

4. A sliding component according to claim 3, wherein the electrical component is at least partially arranged on one of the first ramped end section and the second ramped end section of the groove.

5. A sliding component according to claim 3, wherein the groove has a maximum depth that is between 25% and 75% of a thickness of the substrate.

6. A sliding component according to claim 3, wherein the substrate is cylindrical or semi-cylindrical, and where the groove is arranged to extend circumferentially around a portion of the substrate.

7. A sliding component according to claim 2, wherein the substrate is cylindrical or semi-cylindrical, and the groove is arranged to extend circumferentially around a portion of the substrate.

8. A sliding component according to claim 7, wherein the groove extends circumferentially over an angular distance of 65 degrees or less.

9. A sliding component according to claim 8, wherein an angular position of the groove on the substrate is such that a first end of the groove is at least 8 degrees away from a first joint face of the sliding component.

10. A sliding component according to claim 8, wherein an angular position of the groove on the substrate is such that a second end of the groove is less than 80 degrees away from a first joint face of the sliding component.

11. A sliding component according to claim 7, wherein an angular position of the groove on the substrate is such that at least one of a first end of the groove is at least 8 degrees away from a first joint face of the sliding component, and a second end of the groove is less than 80 degrees away from the first joint face.

12. A sliding component according to claim 11, wherein the angular position of the groove is such that the first end is at least 15 degrees away from the first joint face and the second end is less than 60 degrees away from the first joint face.

13. A sliding component according to claim 7, wherein the groove includes a first ramped end section and a second ramped end section arranged at either end of a central section of uniform depth, and wherein the electrical component is at least partially arranged on one of the first ramped end section and the second ramped end section.

14. A sliding component according to claim 7, wherein the groove extends circumferentially over an angular distance of 45 degrees or less.

15. A sliding component according to claim 7, wherein the groove extends circumferentially over an angular distance of 20 degrees or less.

16. A sliding component according to claim 2, wherein a greatest depth of the groove comprises between 25% and 75% of a thickness of the substrate.

17. A sliding component according to claim 2, wherein the groove has a maximum depth that is between 45% and 60% of a thickness of the substrate.

18. A sliding component according to claim 1, further comprising a connector component including:
    an electrically-insulating insert having a first surface and a second surface;

the electrical connector configured to extend through the electrically-insulating insert to provide an electrical connection from the first surface to the second surface; and wherein the electrically-insulating insert is configured to engage with and seal a hole in the substrate.

19. A sliding component according to claim 18, wherein the substrate includes a groove having a first ramped end section and a second ramped end section with a central section of uniform depth arranged between the first ramped end section and the second ramped end section.

20. A method of manufacturing a sliding component, comprising the steps of:
  providing a connector component including an electrically-insulating insert and an electrical connector extending through the electrically-insulating insert;
  inserting the connector component into a hole through a substrate of the sliding component such that the connector component extends through and seals the hole; and
  forming an electrical connection between an electrical component arranged at a front surface of the substrate and the connector component.

\* \* \* \* \*